United States Patent Office 3,013,989
Patented Dec. 19, 1961

3,013,989
METAL-LOADED MOLECULAR SIEVES
Donald C. Freeman, Jr., Grand Island, N.Y., assignor to Union Carbide Corporation, a corporation of New York
No Drawing. Filed Sept. 24, 1958, Ser. No. 762,962
10 Claims. (Cl. 252—455)

This invention relates to metal-loaded zeolitic molecular sieves and to a process for preparing these materials.

The use of metals and, in some cases, metal oxides, as catalysts, scavengers, and getters in a number of chemical reactions and chemical systems is well known in the chemical art. The effectiveness of the metal in such cases has been found to depend, to a considerable degree, on the form in which the metal is present in the reaction zone.

It is an object of this invention to provide a process for introducing elemental barium and/or barium oxide or nitride into the internal adsorption area of zeolitic molecular sieves.

It is another object of the invention to provide a barium-loaded zeolitic molecular sieve which is a superior scavenger and getter having a higher specific surface of metal for chemisorption and having a corresponding higher surface activity.

Other objects will be apparent from the subsequent disclosure and appended claims.

The process which satisfies the objects of the present invention comprises intimately contacting, in an inert atmosphere, an activated zeolitic molecular sieve with a vapor of barium metal whereby at least a substantial quantity of the metal vapor is adsorbed by the molecular sieve, and cooling said metal-containing zeolitic molecular sieve in an inert atmosphere. The product so obtained contains the barium metal in a form having a high specific surface which is suitable for chemisorption, scavenging, and gettering. Exposure of this material to an oxidizing atmosphere at elevated temperatures will convert the contained barium metal to barium oxide.

Zeolitic molecular sieves, both natural and synthetic, are metal-aluminosilicates. The crystalline structure of these materials is such that a relatively large adsorption area is present inside each crystal. Access to this area may be had by way of openings, or pores, in the crystal. Molecules are selectively adsorbed by molecular sieves on the basis of their size and polarity, among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example metal ions, ammonium ions, amine complexes, or hydrogen ions. The space between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied by the adsorbed barium metal atoms will be available for adsorption of molecules having a size, shape, and energy which permits entry of the adsorbate molecules into the pores of the molecular sieves.

The zeolitic molecular sieves to be useful in the present invention, must be capable of adsorbing oxygen molecules at the normal boiling point of oxygen. Included among these are the preferred natural zeolitic molecular sieves, chabazite, faujasite, erionite, mordenite, gmelinite, and the calcium form of analcite, and the preferred synthetic zeolitic molecular sieves, zeolite A, D, R, S, T, X and Y. The natural materials are adequately described in the chemical art. The characteristics of the synthetic materials and processes for making them are provided below.

The general formula for zeolite X, expressed in terms of mol fractions of oxides, is as follows:

$$0.9 \pm 0.2 M_{\frac{2}{n}}O : Al_2O_3 : 2.5 \pm 0.5 SiO_2 : 0 \text{ to } 8H_2O$$

In the formula "M" represents a cation, for example hydrogen or a metal, and "n" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substantially all of the adsorbed water.

The cation represented in the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is $0.9Na_2O : Al_2O_3 : 2.5SiO_2 : 6.1H_2O$.

The major lines in the X-ray diffraction pattern of zeolite X are set forth in Table A below:

TABLE A

| d Value of Reflection in A | 100 I/I₀ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the K α doublet of copper, and a Geiger counter spectrometer with a strip chart pen recorder was used. The peak heights, I, and the positions as a function of 2θ, where θ is the Bragg angle, were read from the spectrometer chart. From these, the relative intensities, $$\frac{100 I}{I_0}$$

where $I_0$ is the intensity of the strongest line or peak, and $d(obs)$, the interplanar spacing in A., corresponding to the recorded lines were calculated. The X-ray patterns indicate a cubic unit cell of dimensions between 24.5A. and 25.5A.

To make sodium zeolite X, reactants are mixed in aqueous solution and held at about 100° C. until the crystals of zeolite X are formed. Preferably the reactants should be such that in the solution the following ratios prevail:

| $SiO_2/Al_2O_3$ | 3–5 |
|---|---|
| $Na_2O/SiO_2$ | 1.2–1.5 |
| $H_2O/Na_2O$ | 35–60 |

The general formula for zeolite A, expressed in terms of mol fractions of oxides is as follows:

$$1.0 \pm 0.2 M_{\frac{2}{n}}O : Al_2O_3 : 1.85 \pm 0.5 SiO_2 : YH_2O$$

In the formula, "M" represents a metal and "n" its valence, and "Y" may be any value up to 6. The zeolite is activated, or made capable of adsorbing certain molecules by the removal of water from the crystal, as by heating. Thus the actual number of mols of water present in the crystal will depend upon the degree of dehydration or activation of the crystal.

As in the case of zeolite X, the metal represented in the formula by the letter "M" can be changed by conventional ion-exchange techniques. For purposes of convenience the sodium form of zeolite A, designated sodium zeolite A, is synthesized and other forms obtained by the modification of the sodium zeolite A.

A typical formula for sodium zeolite A is $$0.99Na_2O:1.0Al_2O_3:1.85SiO_2:5.1H_2O$$

The major lines in the X-ray diffraction pattern of zeolite A are set forth in Table B below:

TABLE B

| d Value of Reflection in A. | 100 I/I₀ |
|---|---|
| 12.2±0.2 | 100 |
| 8.6±0.2 | 69 |
| 7.05±0.15 | 35 |
| 4.07±0.08 | 36 |
| 3.68±0.07 | 53 |
| 3.38±0.06 | 16 |
| 3.26±0.05 | 47 |
| 2.96±0.05 | 55 |
| 2.73±0.05 | 12 |
| 2.60±0.05 | 22 |

The same procedures and techniques were employed in obtaining the patterns described in Tables A and B.

To make sodium zeolite A, reactants are mixed in aqueous solution and heated at about 100° C. until the crystals of zeolite A are formed. Preferably the reactants should be such that in the solution the following ratios prevail:

SiO₂/Al₂O₃ _____ 0.5–1.3
Na₂O/SiO₂ _____ 1.0–3.0
H₂O/Na₂O _____ 35–200

The chemical formula for zeolite Y expressed in terms of oxides mole ratios may be written as $$0.9\pm0.2Na_2O:Al_2O_3:WSiO_2:XH_2O$$

wherein "W" is a value greater than 3 up to about 5 and "X" may be a value up to about 9.

Zeolite Y has a characteristic X-ray powder diffraction pattern which may be employed to identify zeolite Y. The X-ray powder diffraction data are shown in Table C. The values for the interplanar spacing, $d$, are expressed in angstrom units. The relative intensity of the lines of the X-ray powder diffraction data are expressed as VS, very strong; S, strong; M, medium; W, weak; and VW, very weak.

TABLE C

| hkl | h²+k²+l² | d in A. | Intensity |
|---|---|---|---|
| 111 | 3 | 14.3–14.4 | VS |
| 220 | 8 | 8.73–8.80 | M |
| 311 | 11 | 7.45–7.50 | M |
| 331 | 19 | 5.67–5.71 | S |
| 333, 511 | 27 | 4.75–5.08 | M |
| 440 | 32 | 4.37–4.79 | M |
| 620 | 40 | 3.90–4.46 | W |
| 533 | 43 | 3.77–3.93 | S |
| 444 | 48 | 3.57–3.79 | VW |
| 551, 711 | 51 | 3.46–3.48 | VW |
| 642 | 56 | 3.30–3.33 | S |
| 553, 731 | 59 | 3.22–3.24 | W |
| 733 | 67 | 3.02–3.04 | M |
| 660, 822 | 72 | 2.91–2.93 | M |
| 555, 751 | 75 | 2.85–2.87 | S |
| 840 | 80 | 2.76–2.78 | M |
| 753, 911 | 83 | 2.71–2.73 | W |
| 664 | 88 | 2.63–2.65 | M |
| 931 | 91 | 2.59–2.61 | M |
| 844 | 96 | 2.52–2.54 | VW |
| 862; 10, 2, 0 | 104 | 2.42–2.44 | VW |
| 666; 10, 2, 2 | 108 | 2.38–2.30 | M |
| 775; 11, 1, 1 | 123 | 2.22–2.24 | W |
| 880 | 128 | 2.18–2.20 | W |
| 955; 971; 11, 3, 1 | 131 | 2.16–2.18 | VW |
| 973; 11, 3, 3 | 139 | 2.10–2.11 | W |
| 884; 12, 0, 0 | 144 | 2.06–2.07 | VW |
| 886; 10, 8, 0; 12, 4, 2 | 164 | 1.93–1.94 | VW |
| 10, 8, 2 | 168 | 1.91–1.92 | VW |
| 995; 13, 3, 3 | 187 | 1.81–1.82 | VW |
| 11, 7, 5; 13, 5, 1 | 195 | 1.77–1.78 | VW |
| 10, 8, 6; 10, 10, 0; 14, 2, 0 | 200 | 1.75–1.78 | W |
| 997; 11, 9, 3 | 211 | 1.70–1.71 | W |

When an aqueous colloidal silica sol employed as the major source of silica, zeolite Y may be prepared by preparing an aqueous sodium aluminosilicate mixture having a composition, expressed in terms of oxide-mole-ratios, which falls within one of the following ranges:

| | Range 1 | Range 2 | Range 3 |
|---|---|---|---|
| Na₂O/SiO₂ | 0.20 to 0.40 | 0.41 to 0.61 | 0.61 to 0.80 |
| SiO₂/Al₂O₃ | 10 to 40 | 10 to 30 | 7 to 20 |
| H₂O/Na₂O | 25 to 60 | 20 to 60 | 20 to 60 | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole-ratios, falling within one of the following ranges:

| | Range 1 | Range 2 | Range 3 |
|---|---|---|---|
| Na₂O/SiO₂ | 0.6 to 1.0 | 1.5 to 1.7 | 1.9 to 2.1 |
| SiO₂/Al₂O₃ | 8 to 30 | 10 to 30 | about 10 |
| H₂O/Na₂O | 12 to 90 | 20 to 90 | 40 to 90 | maintaining the mixture at a temperature of about 100° C. until crystals are formed, and separating the crystals from the mother liquor.

The composition of zeolite L, expressed in terms of mole ratios of oxides, may be represented as follows:

$$1.0\pm0.1M_{\frac{2}{n}}O:Al_2O_3:6.4\pm0.5SiO_2:yH_2O$$

wherein "M" designates a metal; "$n$" represents the valence of "M"; and "$y$" may be any value from 0 to about 7.

The more significant $d(A.)$ values, i.e., interplanar spacings, for the major lines in the X-ray diffraction pattern of zeolite L, are given below in Table D.

TABLE D

| | |
|---|---|
| 16.1 ±0.3 | 3.17±0.01 |
| 7.52±0.04 | 3.07±0.01 |
| 6.00±0.02 | 2.91±0.01 |
| 4.57±0.03 | 2.65±0.01 |
| 4.35±0.04 | 2.46±0.01 |
| 3.91±0.02 | 3.17±0.01 |
| 3.47±0.02 | 2.19±0.01 |
| 3.28±0.02 | |

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally water soluble. The exchangeable cations present in the zeolite may then conveniently be replaced by other exchangeable cations.

The potassium or potassium-sodium forms of zeolite L may be prepared by preparing an aqueous metal aluminosilicate mixture having a composition, expressed in terms of mole ratios of oxides falling within the following range:

K₂O/(K₂O+Na₂O) _____ From about 0.33 to about 1.
(K₂O+Na₂O)/SiO₂ _____ From about 0.4 to about 0.5.
SiO₂/Al₂O₃ _____ From about 15 to about 28.
H₂O/(K₂O+Na₂O) _____ From about 15 to about 41.

maintaining the mixture at a temperature of about 100° C. until crystallization occurs, and separating the crystals from the mother liquor.

The chemical formula for zeolite D may be written, in terms of oxides, as follows:

$$0.9 \pm 0.2[x\text{Na}_2\text{O}:(1-x)\text{K}_2\text{O}]:\text{Al}_2\text{O}_3:w\text{SiO}_2:y\text{H}_2\text{O}$$

wherein "$x$" is a value from 0 to 1, "$w$" is from about 4.5 to about 4.9, and "$y$," in the fully hydrated form, is about 7. In the preferred form of zeolite D, "$x$" is in the range of from 0.4 to 0.6.

Zeolite D has an X-ray powder diffraction pattern substantially like that shown in Table E.

TABLE E

*X-ray diffraction patterns of Zeolite D*

[$d$ = interplanar spacing in A.: I/I max. = relative intensity]

| Zeolite D | |
|---|---|
| $d$, A. | I/I max. |
| 9.42 | 66 |
| 6.89 | 67 |
| 5.54 | 15 |
| 5.03 | 62 |
| 4.33 | 62 |
| 3.98 | 27 |
| 3.89 | 23 |
| 3.60 | 12 |
| 3.45 | 39 |
| 3.19 | 15 |
| 2.94 | 100 |
| 2.69 | 9 |
| 2.61 | 38 |
| 2.30 | 16 |
| 2.09 | 22 |
| 1.81 | 29 |
| 1.73 | 23 |

Zeolite D may be prepared as follows:

A sodium-potassium aluminosilicate-water mixture is prepared such that the initial composition of the reactant mixture in terms of oxide-mole-ratios is:

$$\frac{\text{Na}_2\text{O} + \text{K}_2\text{O}}{\text{SiO}_2} = 0.45 \text{ to } 0.65$$

$$\frac{\text{Na}_2\text{O}}{\text{Na}_2\text{O} + \text{K}_2\text{O}} = 0.74 \text{ to } 0.92$$

$$\frac{\text{SiO}_2}{\text{Al}_2\text{O}_3} = \text{about } 28$$

$$\frac{\text{H}_2\text{O}}{\text{Na}_2\text{O} + \text{K}_2\text{O}} = 18 \text{ to } 45$$

The mixture is maintained at a temperature within the range of about 100° C. to 120° C. until crystals are formed; the crystals are then separated from the mother liquor.

The chemical formula for zeolite R may be written as:

$$0.9 \pm 0.2 \text{Na}_2\text{O}: \text{Al}_2\text{O}_3:W\text{SiO}_2:X\text{H}_2\text{O}$$

wherein "$W$" is from 3.45 to 3.65, and "$X$," for the fully hydrated form, is about 7.

Zeolite R has an X-ray powder diffraction pattern substantially like that shown in Table F.

TABLE F

*X-ray diffraction patterns of Zeolite R*

[$d$ = interplanar spacing in A.: I/I max. = relative intensity]

| Zeolite R | |
|---|---|
| $d$, A. | 100 (I/I max.) |
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

Zeolite R may be prepared as follows:

A sodium aluminosilicate-water mixture is prepared such that the initial composition of the reactant mixture, in terms of oxide-mole-ratios, falls within any one of the following seven ranges:

|  | I | II | III | IV | V | VI | VII |
|---|---|---|---|---|---|---|---|
| Na$_2$O/SiO$_2$ | 0.20 to 0.40 | 0.41 to 0.60 | 0.61 to 0.80 | 0.81 to 1.0 | 0.81 to 1.0 | 1.7 to 1.9 | 1.2 to 1.4 |
| SiO$_2$/Al$_2$O$_3$ | about 4 | 3.5 to 6.0 | 3.5 to 6.5 | 3 to 4.5 | about 30 | 10 to 25 | about 6 |
| H$_2$O/Na$_2$O | 22 to 60 | 30 to 60 | 40 to 80 | 40 to 80 | 50 to 60 | 60 to 70 | 80 to 90 |

The mixture is maintained at a temperature within the range of about 100° C. to 120° C. until crystals are formed; the crystals are then separated from the mother liquor.

The chemical formula for zeolite S may be written as:

$$0.9 \pm 0.2\text{Na}_2\text{O}:\text{Al}_2\text{O}_3:W\text{SiO}_2:X\text{H}_2\text{O}$$

wherein "$W$" is from 4.6 to 5.9 and "$X$," for the fully hydrated form, is from about 6 to 7.

Zeolite S has a characteristic X-ray powder diffraction pattern which may be employed to identify zeolite S. The X-ray powder diffraction data are shown in Table G.

TABLE G

*X-ray diffraction patterns of synthetic zeolite S*

[$d$ = interplanar spacing in A.: I/I max. = relative intensity]

| $d$, A. | 100 (I/I max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |
| 2.973 | 80 |
| 2.858 | 47 |
| 2.693 | 19 |
| 2.603 | 39 |
| 2.126 | 11 |
| 2.089 | 39 |
| 1.910 | 12 |
| 1.809 | 40 |
| 1.722 | 32 |

Zeolite S may be prepared by preparing a sodium aluminosilicate-water mixture such that the composition of the reactant mixture, in terms of oxide-mole-ratios, falls within the following range when the source of silica is an aqueous colloidal silica sol:

$Na_2O/SiO_2$ ------------------------------ 0.3 to 0.6
$SiO_2/Al_2O_3$ ----------------------------- 6 to 10
$H_2O/Na_2O$ ------------------------------- 20 to 100 and falls within the following range when the source of silica is sodium silicate:

$Na_2O/SiO_2$ ------------------------------ About 0.5
$SiO_2/Al_2O_3$ ----------------------------- About 25
$H_2O/Na_2O$ ------------------------------- About 18 maintaining the mixture at a temperature in the range of from about 80° C. up to about 120° C., preferably at about 100° C., and at a pressure at least equal to the vapor pressure of water in equilibrium with the mixture of reactants until crystals are formed; and separating the crystals from the mother liquor.

The chemical formula for zeolite T may be written, in terms of mole ratios of oxides, as follows:

$$1.1 \pm 0.4[xNa_2O:(1-x)K_2O]:Al_2O_3:6.9\pm0.5SiO_2:yH_2O$$

wherein "$x$" may be any value from about 0.1 to about 0.8 and "$y$" may be any value from about 0 to about 8. Zeolite T may be identified and distinguished from other zeolites, and other crystalline substances, by its X-ray powder diffraction pattern. The data which are set forth below in Table H are for a typical example of zeolite T.

TABLE H

| Bragg Angle, $2\theta$ | Interplanar Spacing, $d$ (A.) | Relative Intensity, $100I/I_0$ |
|---|---|---|
| 7.72 | 11.45 | 100 |
| 9.63 | 9.18 | 4 |
| 11.74 | 7.54 | 13 |
| 13.35 | 6.63 | 54 |
| 14.74 | 6.01 | 2 |
| 15.44 | 5.74 | 6 |
| 17.78 | 4.99 | 2 |
| 19.43 | 4.57 | 8 |
| 20.46 | 4.34 | 45 |
| 21.35 | 4.16 | 3 |
| 21.78 | 4.08 | 2 |
| 23.27 | 3.82 | 16 |
| 23.64 | 3.76 | 56 |
| 24.28 | 3.67 | 1 |
| 24.82 | 3.59 | 30 |
| 26.04 | 3.42 | 2 |
| 26.92 | 3.31 | 16 |
| 28.04 | 3.18 | 12 |
| 28.29 | 3.15 | 18 |
| 30.47 | 2.93 | 11 |
| 31.15 | 2.87 | 38 |
| 31.38 | 2.85 | 45 |
| 33.41 | 2.68 | 11 |
| 34.32 | 2.61 | 2 |
| 35.83 | 2.51 | 8 |
| 36.09 | 2.49 | 13 |
| 39.26 | 2.30 | 2 |
| 40.81 | 2.21 | 6 |
| 42.61 | 2.12 | 5 |
| 43.33 | 2.09 | 3 |
| 45.58 | 1.99 | 2 |
| 46.30 | 1.96 | 2 |
| 48.17 | 1.89 | 8 |
| 48.84 | 1.86 | 2 |
| 49.61 | 1.84 | 4 |
| 51.44 | 1.78 | 8 |
| 51.58 | 1.77 | 5 |
| 52.29 | 1.75 | 2 |
| 53.68 | 1.71 | 3 |
| 55.40 | 1.66 | 9 |
| 58.03 | 1.59 | 5 |
| 60.82 | 1.52 | 1 |
| 61.48 | 1.51 | 2 |
| 63.29 | 1.47 | 3 |
| 66.24 | 1.41 | 1 |
| 67.65 | 1.38 | 3 |

Zeolite T may be prepared by preparing an aqueous sodium-potasium aluminosilicate mixture having a composition, expressed in terms of mole ratios of oxides, falling within the following range:

$Na_2O/(Na_2O+K_2O)$
$(Na_2O+K_2O)/SiO_2$
$SiO_2/Al_2O_3$
$H_2O/(Na_2O+K_2O)$

From about 0.7 to about 0.8.
From about 0.4 to about 0.5.
About 20 to 28.
About 40 to 42.

maintaining the mixture at a temperature of about 100° C. until crystallization occurs, and separating the crystals from the mother liquor.

To prepare the elemental metal-containing zeolitic molecular sieves by the process of the present invention, it is first necessary to activate the zeolitic molecular sieves, i.e., to drive off substantially all of the contained water. This may be accomplished by heating the zeolitic molecular sieves up to a temperature of about 350° C. in a flowing stream of inert dry gas or in a vacuum. The activated molecular sieve is then ready to receive the barium metal vapors.

The activated zeolite molecular sieves and the barium metal vapors may be brought into contact with each other by mixing molten barium and the molecular sieves under vacuum, by vaporizing the barium in the presence of the molecular sieves, or by entraining the metal vapors in an inert gas and passing the metal vapor-containing gas stream through a bed of the molecular sieves.

In an example of the invention, about 25 grams of activated sodium zeolite X pellets in the range of 8 to 12 mesh size were placed in a horizontally mounted quartz tube. About 5 g. of clean barium metal was placed in the tube in a molybdenum boat adjacent to the sodium zeolite X. The tube was evacuated to less than $1 \times 10^{-5}$ mm. Hg and that portion of the tube containing the zeolite was heated to 650° C. with a furnace for about 60 hours to remove all traces of water and adsorbed gases. The tube was cooled down and closed off under vacuum. The barium was moved into the furnace zone, which was then heated to 600° C. for 30 minutes. After cooling the zeolite was black. The barium-loaded zeolite was sealed off in vacuum in glass side arms previously mounted on the quartz tube for the purpose. The zeolite was found to contain 3.5 weight percent barium as barium oxide and nitride after exposure to air.

Many advantages accrue from the use of barium-loaded zeolitic molecular sieves that are not available with other materials. For example, barium has been recognized as a good getter for oxygen and other gases. However, the barium-loaded zeolitic molecular sieves may be employed for selective gettering from a mixed system, without contamination of the system being so treated.

Still another advantage of employing the product of the present invention resides in the manner in which the metal is held in the molecular sieve. Getters consisting of barium metal on a support usually have the problem that the metal tends to migrate and agglomerate. This tends to decrease the active metal surface available for gettering since below 40° C. only the surface atoms of barium are effective for gettering. By incorporating the metal on the inside of the zeolitic molecular sieves, the tendency for the metal to migrate is minimized with a corresponding increase in the efficiency of the getter.

By incorporating the barium in the zeolitic molecular sieves in accordance with the present invention, a suitable means for adding barium to other chemical systems is provided. By adding the barium in this form, it is possible to control the reactivity of the metal to a much greater extent than is possible by direct addition of the metal to the same chemical systems.

Still another use for the barium-loaded zeolitic molecular sieves of the present invention is in the preparation of barium oxide-loaded molecular sieves by exposure of the barium-loaded molecular sieves to an oxidizing atmosphere at elevated temperatures. The oxidized product is useful as a coating material for vacuum tube cathodes. Oxides of barium prepared in situ may be employed as catalysts or promoters.

As used herein the term "activation" is employed to designate the removal of water from the zeolitic molecular sieves, i.e., dehydration, and does not refer to catalytic activity. The zeolitic molecular sieves containing the elemental metal and/or metal oxides exhibit catalytic activity.

The product of the present invention has a surface area about four times that expected with most alumina, silica or aluminosilicate supported metals thereby providing a greater surface area available for reaction. Since the external surface of the molecular sieve represents less than 1 percent of the total surface area it may be seen that there is an extremely large area available for chemisorption and catalysts in the internal portion of the molecular sieves. Since this region is available only through pores of molecular size it may be seen that selective chemisorption and gettering may be obtained in a system containing a mixture of molecules some of which are too large to enter the pores whereas others are capable of entering the pores.

Zeolite A is described and claimed in U.S. Patent No. 2,882,243, issued April 14, 1959 to R. M. Milton.

Zeolite D is described and claimed in U.S. patent application Serial No. 680,383, filed August 26, 1957.

Zeolite L is described and claimed in U.S. patent application Serial No. 711,565, filed January 28, 1958.

Zeolite R is described and claimed in U.S. patent application Serial No. 680,381, filed August 26, 1957.

Zeolite S is described and claimed in U.S. patent application Serial No. 724,843, filed March 31, 1958.

Zeolite T is described and claimed in U.S. patent application Serial No. 733,819, filed May 8, 1958, now U.S. Patent No. 2,950,952.

Zeolite X is described and claimed in U.S. Patent No. 2,882,244, issued April 14, 1959 to R. M. Milton.

Zeolite Y is described and claimed in U.S. patent application Serial No. 728,057, filed April 14, 1958.

The preferred compositions of matter for the present invention which have been found to be most satisfactory and useful for gettering purposes are the metal-loaded zeolites X, Y, and faujasite.

Erionite is a naturally occurring zeolite, described originally by Eakle, Am. J. Science (4), 6, 66 (1898). It is most readily identified by its characteristic X-ray powder diffraction pattern. The $d$-spacings, in A. and relative intensities thereof, obtained on a well-crystallized specimen are tabulated below.

X-RAY POWDER DATA, ERIONITE

| $d$-spacing, A. | Relative Intensity, $I/I_o \times 100$ |
|---|---|
| 11.38 | 100 |
| 9.06 | 10 |
| 7.50 | 10 |
| 6.56 | 40 |
| 6.24 | 10 |
| 5.68 | 10 |
| 5.34 | 10 |
| 4.56 | 10 |
| 4.31 | 40 |
| 4.15 | 20 |
| 3.80 | 20 |
| 3.74 | 40 |
| 3.58 | 30 |
| 3.30 | 10 |
| 3.27 | 10 |
| 3.20 | 10 |
| 3.16 | 10 |
| 3.14 | 10 |
| 3.00 | 5 |
| 2.92 | 5 |
| 2.86 | 30 |
| 2.83 | 30 |
| 2.805 | 20 |
| 2.67 | 10 |
| 2.59 | 5 |
| 2.49 | 10 |
| 2.47 | 10 |
| 2.20 | 5 |
| 2.11 | 5 |
| 1.88 | 5 |
| 1.83 | 5 |
| 1.77 | 10 |
| 1.65 | 10 |

What is claimed is:

1. As a new composition of matter a dehydrated rigid three-dimensional crystalline metal aluminosilicate zeolite of the molecular sieve type capable of adsorbing oxygen internally at the normal boiling point of oxygen containing a material selected from the group consisting of elemental barium, barium oxide, and barium nitride, in the inner adsorption region of said crystalline metal aluminosilicate zeolite.

2. A process for preparing a barium-loaded rigid three-dimensional crystalline metal aluminosilicate zeolite of the molecular sieve type which comprises dehydrating a rigid three-dimensional crystalline metal aluminosilicate zeolite of the molecular sieve type capable of adsorbing oxygen internally at the normal boiling point of oxygen whereby substantially all of the water of hydration of said crystalline metal aluminosilicate zeolite is removed; intimately contacting, in an inert atmosphere said dehydrated crystalline metal aluminosilicate with barium vapor, the temperature of said vapor being below the temperature of crystal destruction for said crystalline metal aluminosilicate zeolite, whereby said metal vapor is adsorbed into the inner adsorption region of said dehydrated crystalline metal aluminosilicate zeolite; and cooling said dehydrated crystalline metal aluminosilicate zeolite containing said adsorbed metal vapor in an inert atmosphere or in vacuum whereby said adsorbed barium vapor is retained in the inner adsorption region of said crystalline metal aluminosilicate zeolite.

3. A process for preparing an elemental barium-containing rigid three-dimensional crystalline metal aluminosilicate zeolite of the molecular sieve type which comprises dehydrating a rigid three-dimensional crystalline metal aluminosilicate zeolite of the molecular sieve type capable of adsorbing oxygen internally at the normal boiling point of oxygen whereby substantially all of the water of hydration of said crystalline metal aluminosilicate zeolite is removed; intimately contacting said dehydrated crystalline metal aluminosilicate zeolite with an inert gas containing entrained barium vapor, said inert gas and said entrained barium vapor being at a temperature below the temperature of destruction of said dehydrated crystalline metal aluminosilicate zeolite crystal whereby said barium vapor is adsorbed into the inner adsorption region of said dehydrated crystalline metal aluminosilicate zeolite; and cooling said dehydrated crystalline metal aluminosilicate zeolite containing said adsorbed barium vapor whereby elemental barium is retained in the inner adsorption region of said crystalline metal aluminosilicate zeolite.

4. As a new composition of matter a dehydrated rigid three-dimensional crystalline metal aluminosilicate zeolite of the molecular sieve type chosen from the group consisting of zeolite A, zeolite D, zeolite R, zeolite S, zeolite T, zeolite X, zeolite Y, chabazite, faujasite, erionite, mordenite, gmelinite and the calcium form of analcite containing a material selected from the group consisting of elemental barium, barium oxide and barium nitride in the inner adsorption region of said crystalline metal aluminosilicate zeolite.

5. A composition of matter as described in claim 4 wherein the crystalline metal aluminosilicate zeolite is zeolite X.

6. A process for preparing a barium-loaded rigid three-dimensional crystalline metal aluminosilicate zeolite of the molecular sieve type which comprises dehydrating a rigid three-dimensional crystalline metal aluminosilicate zeolite of the molecular sieve type chosen from the group consisting of zeolite A, zeolite D, zeolite L, zeolite R, zeolite S, zeolite T, zeolite X, zeolite Y, chabazite, faujasite, erionite, mordenite, gmelinite and the calcium form of analcite whereby substantially all of the water of hydration of said crystalline metal aluminosilicate zeolite is removed; intimately contacting, in an inert atmosphere said dehydrated crystalline metal aluminosilicate zeolite with barium vapor, the temperature of said vapor being below the temperature of crystal destruction for said crystalline metal aluminosilicate zeolite, whereby said metal vapor is adsorbed into the inner adsorption region of said dehydrated crystalline metal aluminosilicate zeolite; and cooling said dehydrated crystalline metal aluminosilicate zeolite containing said adsorbed metal vapor in an inert atmosphere whereby said adsorbed barium vapor is retained in the inner adsorption region of said crystalline metal aluminosilicate zeolite.

7. A process for preparing an elemental barium-containing rigid three-dimensional crystalline metal aluminosilicate zeolite of the molecular sieve type which comprises dehydrating a rigid three-dimensional crystalline metal aluminosilicate zeolite of the molecular sieve type chosen from the group consisting of zeolite A, zeolite D, zeolite L, zeolite R, zeolite S, zeolite T, zeolite X, zeolite Y, chabazite, faujasite, erionite, mordenite, gmelinite and the calcium form of analcite whereby substantially all of the water of hydration of said crystalline metal aluminosilicate zeolite is removed, intimately contacting said dehydrated crystalline metal aluminosilicate zeolite with an inert gas containing entrained barium vapor, said inert gas and said entrained barium vapor being at a temperature below the temperature of destruction of said dehydrated crystalline metal aluminosilicate zeolite crystals whereby said barium vapor is adsorbed into the inner adsorption region of said crystalline metal aluminosilicate zeolite, and cooling said dehydrated crystalline metal aluminosilicate zeolite containing said adsorbed barium vapor whereby elemental barium is retained in the inner adsorption region of said crystalline metal aluminosilicate zeolite.

8. A process as described in claim 2 wherein the crystalline metal aluminosilicate zeolite is intimately contacted with barium vapor in a vacuum.

9. A process as described in claim 6 wherein the crystalline metal aluminosilicate is zeolite X.

10. A process as described in claim 7 wherein the crystalline metal aluminosilicate zeolite is zeolite X.

References Cited in the file of this patent

UNITED STATES PATENTS

| | | |
|---|---|---|
| 1,840,450 | Jaeger et al. | Jan. 12, 1932 |
| 2,306,610 | Barrer | Dec. 29, 1942 |
| 2,413,134 | Barrer | Dec. 24, 1946 |
| 2,617,712 | Bond | Nov. 11, 1952 |
| 2,859,257 | Hess | Nov. 4, 1958 |
| 2,882,243 | Milton | Apr. 14, 1959 |
| 2,882,244 | Milton | Apr. 14, 1959 |